United States Patent
Matsui et al.

(10) Patent No.: US 12,432,450 B2
(45) Date of Patent: Sep. 30, 2025

(54) IMAGING SYSTEM AND MOVING BODY PROVIDED WITH SAME

(71) Applicant: Panasonic Intellectual Property Management Co., Ltd., Osaka (JP)

(72) Inventors: Satoshi Matsui, Kyoto (JP); Norikazu Katsuyama, Osaka (JP); Yusuke Matsumoto, Osaka (JP); Yusuke Adachi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 101 days.

(21) Appl. No.: 18/413,646

(22) Filed: Jan. 16, 2024

(65) Prior Publication Data

US 2024/0276099 A1    Aug. 15, 2024

Related U.S. Application Data

(63) Continuation of application No. PCT/JP2022/026044, filed on Jun. 29, 2022.

(30) Foreign Application Priority Data

Jul. 21, 2021   (JP) .................................. 2021-120716

(51) Int. Cl.
  *H04N 23/68* (2023.01)
  *G06T 5/73* (2024.01)

(52) U.S. Cl.
  CPC ............ *H04N 23/683* (2023.01); *G06T 5/73* (2024.01); *H04N 23/6812* (2023.01); *H04N 23/687* (2023.01); *G06T 2207/20201* (2013.01)

(58) Field of Classification Search
  None
  See application file for complete search history.

(56) References Cited

U.S. PATENT DOCUMENTS

2005/0225645 A1* 10/2005 Kaku ..................... G06T 7/20
                                                348/208.99
2016/0261798 A1   9/2016 Ishikawa et al.
(Continued)

FOREIGN PATENT DOCUMENTS

WO    2015/060181    4/2015

OTHER PUBLICATIONS

English translation of International Preliminary Report on Patentability issued Jan. 18, 2024 in International (PCT) Application No. PCT/JP2022/026044.

(Continued)

Primary Examiner — Quan Pham
(74) Attorney, Agent, or Firm — WENDEROTH, LIND & PONACK L.L.P.

(57) ABSTRACT

An imaging system located on a moving body, includes an imaging device, a blur correction device, and an image processor. Based on a subject distance from the imaging device to the object to be imaged, the blur correction device sets a blur correction amount of blur in a movement direction caused when the imaging device captures images during movement of the moving body. The blur correction device corrects blur during image capturing by use of the set blur correction amount. The image processor calculates a pixel movement amount of a feature portion common to a first image and a second image. Based on the pixel movement amount and the movement amount of the moving body, the blur correction device calculates a third distance as the subject distance.

20 Claims, 12 Drawing Sheets

(56) References Cited

U.S. PATENT DOCUMENTS

| | | | |
|---|---|---|---|
| 2016/0286130 A1* | 9/2016 | Ryu | G06T 7/246 |
| 2017/0134658 A1* | 5/2017 | Miyahara | H03H 17/04 |
| 2020/0236284 A1* | 7/2020 | Miyazawa | H04N 23/6812 |

OTHER PUBLICATIONS

International Search Report issued Sep. 13, 2022 in International (PCT) Application No. PCT/JP2022/026044.

\* cited by examiner

IMAGING SYSTEM AND MOVING BODY PROVIDED WITH SAME

CROSS-REFERENCE TO RELATED APPLICATIONS

This is a continuation application of International Application No. PCT/JP2022/026044, with an international filing date of Jun. 29, 2022, which claims priority of Japanese Patent Application No. 2021-120716 filed on Jul. 21, 2021, the content of which is incorporated herein by reference.

BACKGROUND

Technical Field

The present disclosure relates to an imaging system that corrects blur depending on movement of a moving body, and a moving body provided with the same.

Background Art

As transportation infrastructure ages, demand for infrastructure inspections is increasing. Inspection efficiencies are remarkably improved by imaging infrastructural facilities while moving with a moving body and detecting defective sites through image processing of captured images, instead of human visual inspections. However, imaging while moving causes blur in the captured images.

For example, in WO2015060181, blur caused by camera displacement during exposure is corrected using Saccade Mirror technique. Blur is reduced by irradiating light onto an object to be imaged and causing light reflected on the object to be imaged to reflect on a mirror pivoting during pre-defined exposure time and fall on a camera.

SUMMARY

It is difficult, however, to keep constant the distance between the object to be imaged and an imaging device moving together with the moving body, and therefore blur correction deteriorates due to change in the distance between the object to be imaged and the imaging device.

The present disclosure provides an imaging system that suppresses deterioration of blur correction even in image capturing while moving, and a moving body including the imaging system.

An imaging system of the present disclosure is an imaging system disposed on a moving body, including: an imaging device that images, as an object to be imaged, at least a part of surroundings of the moving body; and a blur correction device having a blur correction amount setting part that sets, based on a subject distance from the imaging device to the object to be imaged, a blur correction amount of blur in a movement direction caused when the imaging device captures images during movement of the moving body, the blur correction device correcting blur during image capturing by use of the set blur correction amount. A first image is acquired by the imaging device while being blur-corrected by the blur correction device with a blur correction amount set based on a first distance as the subject distance. Posterior to the first image, a second image is acquired by the imaging device while being blur-corrected by the blur correction device with a blur correction amount set based on a second distance as the subject distance. The imaging system includes an image processor calculating a pixel movement amount of a feature portion common to the first image and the second image. Based on the pixel movement amount and the movement amount of the moving body, the image processor calculates a third distance as the subject distance of a third image captured posterior to the second image.

A moving body of the present disclosure includes the imaging system described above.

According to the imaging system and the moving body including the same, of the present disclosure, it is possible to provide an imaging system that suppresses deterioration of blur correction even in image capturing while moving, and a moving body including the imaging system.

DETAILED DESCRIPTION

Embodiment

An embodiment will now be described with reference to the drawings. In the embodiment, a moving body is a vehicle 3 such as an automobile, and the case will be described as an example where an imaging system 1 is mounted on an upper portion of the vehicle 3.

1. Imaging System Configuration

Figure 1:
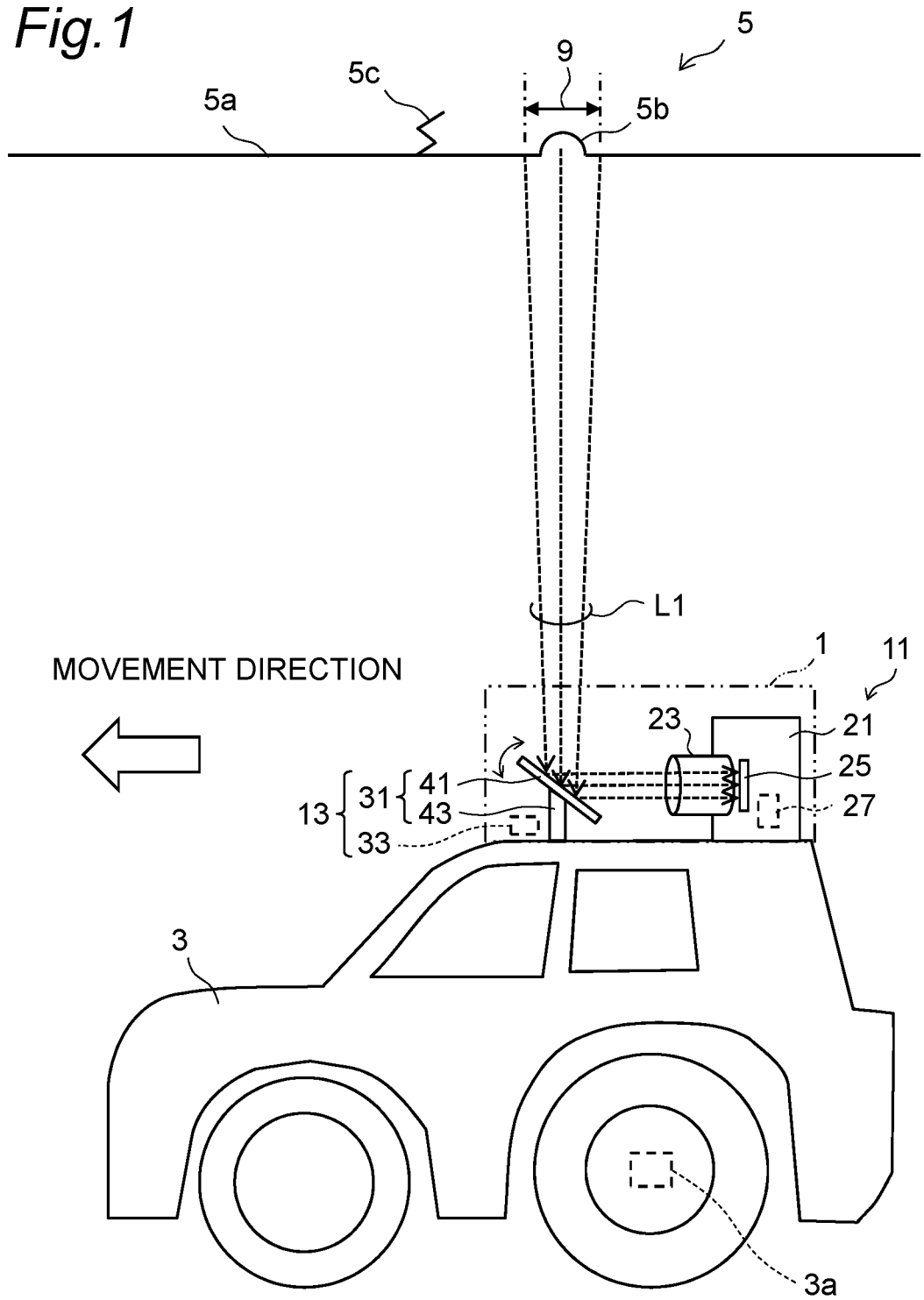
FIG. 1 shows a vehicle including an imaging system.
Figure 2:
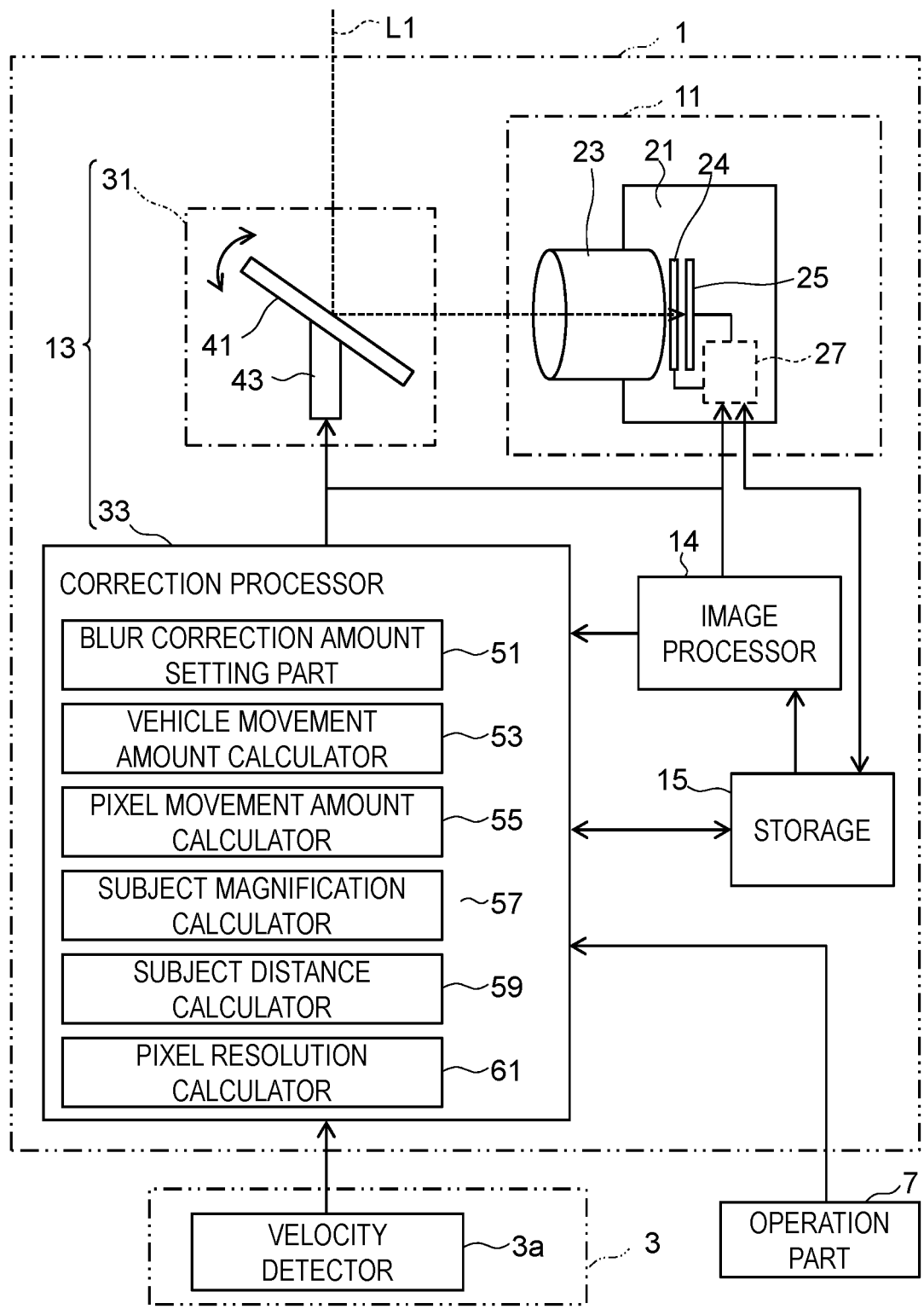
FIG. 2 shows a configuration of the imaging system of an embodiment.

Reference is made to FIGS. 1 and 2. FIG. 1 is a diagram for explaining the imaging system 1. FIG. 2 is a block diagram showing an internal configuration of the imaging system 1. In FIG. 1, the vehicle 3 is running, for example, through the interior of a tunnel 5. On a wall surface 5a inside the tunnel 5 there occurs, for example, a hole 5b or crack 5c.

An object to be imaged by the imaging system 1 is at least a part of a structure around the vehicle 3 and is the object that moves relatively according to the movement velocity of the vehicle 3 along with the movement of the vehicle 3. An area 9 to be imaged is an area to be acquired as an image in this object to be imaged. Other than the inner wall of the tunnel 5, the object to be imaged may be lateral surfaces or a bottom surface of an overpass, an electric pole, or an electric wire. This enables detection of holes, cracks, lifting, peeling, and joints of the object to be imaged, the inclination of the electric pole, and the deflection of the electric wire, by image processing based on images acquired.

The vehicle 3 includes a velocity detector 3a that detects the movement velocity of the vehicle 3. The velocity detector 3a is, for example, a vehicle velocity sensor that detects the movement velocity from the rotation speed of axles of the vehicle 3.

An imaging system 1 is disposed on an upper surface of the vehicle 3. Although in FIG. 1, the imaging system 1 is fixed so as to capture an image of a structure above the vehicle 3, for example, the wall surface 5a of the tunnel 5, it may be disposed so as to capture an image of the wall surface 5a lateral to or diagonally lateral to the vehicle 3.

The imaging system 1 includes an imaging device 11, a blur correction device 13, an image processor 14, and a storage 15. The imaging device 11 captures an image of a structure around the vehicle 3, and, if the vehicle 3 runs through the interior of the tunnel 5, captures an image of the wall surface 5a of the tunnel 5. The imaging device 11 includes a camera body 21, a lens 23 as an optical system lens, a shutter 24, an imaging element 25, and a camera controller 27.

The lens 23 is replaceably attached to the camera body 21, which houses the imaging element 25 and the camera controller 27. The imaging element 25 is located at a position of a focal length F of the lens 23. The imaging element 25 is, for example, a solid-state imaging element such as a CCD image sensor, a CMOS image sensor, or an infrared image sensor. The camera body 21 is arranged on the vehicle 3 so that the orientation of the lens 23 is parallel to the movement direction of the vehicle 3. For example, the camera body 21 is arranged so that the lens 23 faces the front or rear of the vehicle 3. The camera body 21 and the lens 23 may be of an integrated type like e.g., a video camera, with a blur correction mechanism 31 arranged outside of the integrated camera body 21 and lens 23. The camera controller 27 opens the shutter 24 during reception of an exposure instruction signal from a correction processor 33. The shutter 24 may be configured such that a plurality of blade diaphragms are opened and closed, or may be an electronic shutter.

The blur correction device 13 corrects the optical path of light incident on the imaging system 1 so that image blur of the area 9 to be imaged is reduced even though the imaging device 11 captures images while the vehicle 3 moves. The blur correction device 13 includes the blur correction mechanism 31 and the correction processor 33.

The blur correction mechanism 31 corrects the optical path of reflection light L1 of ambient light reflected on the area 9 to be imaged in unison with movement of the vehicle 3. The blur correction mechanism 31 includes a mirror 41 and a mirror drive 43 that pivotally drives the mirror 41. Instead of using the mirror 41, the blur correction mechanism 31 may be a pan and tilt mechanism that drives a lens barrel having the lens 23 and the imaging element 25 integrated, around a pivot axis, for example, in the pan direction and the tilt direction. The pan and tilt mechanism has a drive pivotally driving the integrated lens 23 and imaging element 25. The drive is, for example, a motor. The blur correction mechanism 31 may have a tilt function of vertically pivoting the camera body 21 and the lens 23, and a pan function of transversely pivoting them. The blur correction mechanism 31 may be a mechanism that rotationally drives the entire imaging device 11 or may have an optical system lens drive mechanism and an imaging element drive mechanism. In the case of correcting blur without using the mirror in this manner, the lens 23 and the camera body 21 are disposed so that the orientation of the lens 23 is perpendicular to the movement direction of the vehicle 3.

The mirror 41 is arranged pivotally so as to face the lens 23. For example, the mirror 41 is pivotable in both the clockwise positive direction and the reverse directions, and the pivotable angular range may be less than 360 degrees or may be equal to or greater than 360 degrees. The mirror 41 totally reflects ambient light reflected on the object to be imaged toward the direction of the imaging element 25 of the imaging device 11. The mirror drive 43 pivotally drives the mirror 41 from an initial angle to an angle instructed to correct the imaging blur, and again returns the mirror 41 to the initial angle after pivoting it to the instructed angle. The mirror drive 43 is, for example, a motor. The pivotal angle of the mirror 41 is limited by mechanical constraints of the mirror drive 43, and the mirror 41 can be pivoted up to a maximum swing angle of the mirror 41 that is determined by this limitation.

Figure 3A:
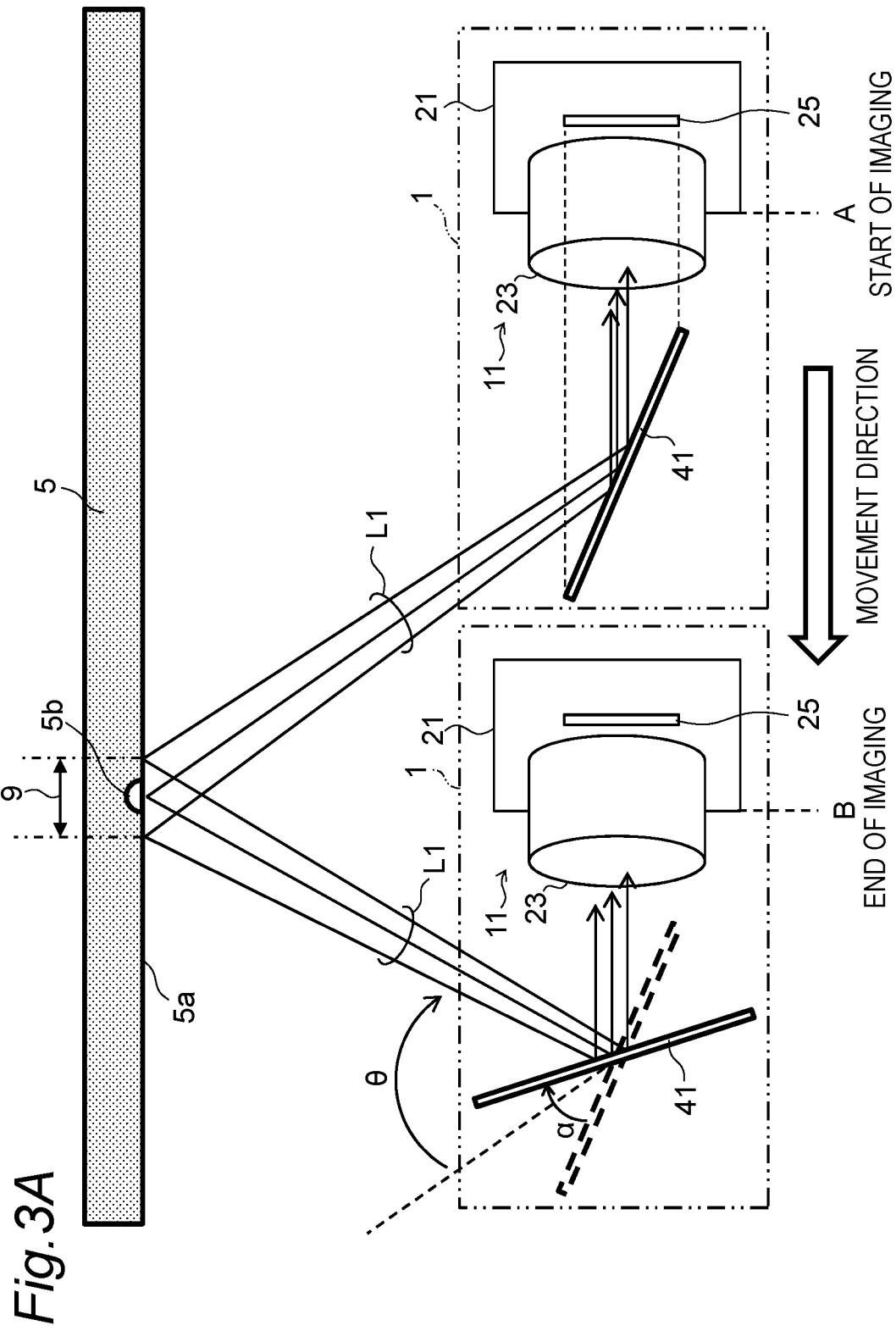
FIG. 3A illustrates blur correction in the imaging system.
Figure 4A:
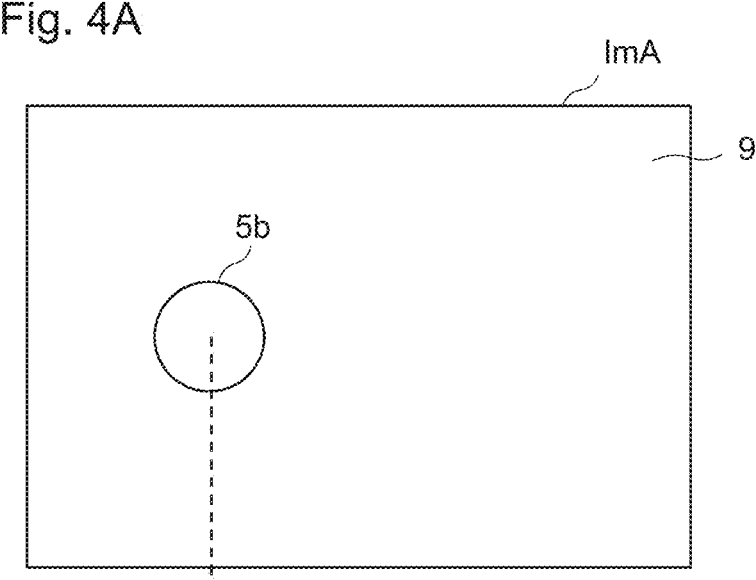
FIGS. 4A and 4B illustrate images captured without blur correction during exposure.
Figure 4B:
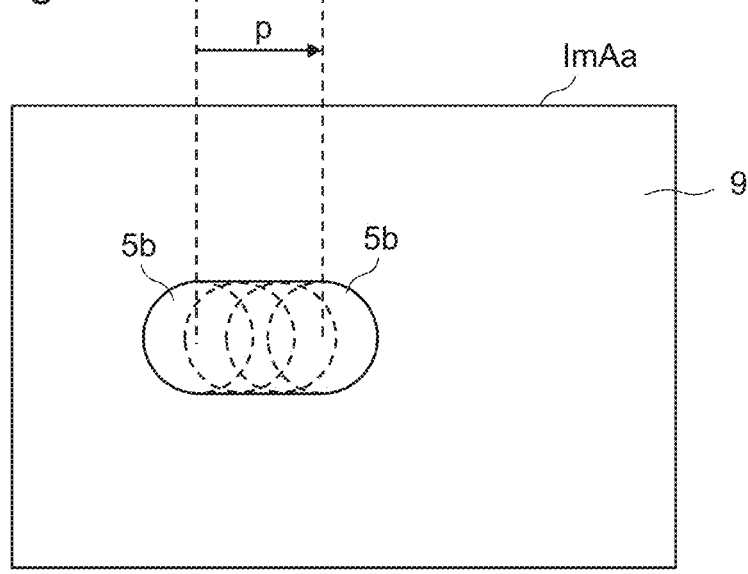

Referring to FIGS. 3A and 4, the blur correction by the blur correction device 13 will be described. FIG. 3A is an explanatory view explaining the blur correction in the imaging system 1. FIG. 4 shows images captured without the blur correction, with FIG. 4A showing an image at timing of start of imaging, FIG. 4B showing an image at timing of end of imaging.

Assume, for example, that the imaging system 1 located at a position A moves to a position B together with the vehicle 3 in exposure time Tp. The imaging system 1 starts imaging at the position A, an image ImA acquirable at which timing is shown in FIG. 4A. In the image ImA, for example, a hole 5b of the area 9 to be imaged is captured. However, the image ImA is a dark image and is not clear due to insufficient exposure time.

Accordingly, the imaging system 1 continues exposure until the vehicle 3 moves to the position B. In this case, if no blur correction is carried out, the area 9 to be imaged moves relatively in the direction opposite to the movement direction of the vehicle 3, with the result that an image ImAa is obtained where the hole 5b moves relatively, as shown in FIG. 4B. In the image ImAa, a movement amount P of pixel is detected as the blur amount. In this manner, an image captured by the imaging device 11 during movement of the vehicle 3 becomes a blurred image.

Hence, by allowing a movement direction end of the mirror 41 to pivot the mirror 41 during the exposure time, depending on the movement velocity of the imaging system 1 and the vehicle 3, in a direction to cancel the relative movement of the object to be imaged, the imaging system 1 can capture the same area 9 to be imaged in a captured image during the exposure time, enabling acquisition of an image with remarkably reduced blur. In FIG. 1, the mirror 41 is pivoted clockwise so that the movement direction end of the mirror 41 turns facing the object to be imaged during the exposure time. By pivoting the mirror 41, the movement amount P of pixel is corrected to zero in the image ImAa.

An overview of this embodiment will then be described. As will be described later, the blur correction amount during image capturing changes depending on the magnitude of the pixel movement amount from the start to the end of imaging, of a feature point contained in the object to be imaged. The pixel movement amount is proportional to a subject magnification M, in addition to the vehicle movement amount. The subject magnification M is inversely proportional to a subject distance from the imaging element 25 to the object to be imaged. Therefore, when the subject distance varies, the movement amount P of pixel also varies, with the result that if the blur correction amount is not set depending on the variation of the subject distance, the blur correction accuracy during the image capturing lowers.

Figure 3B:
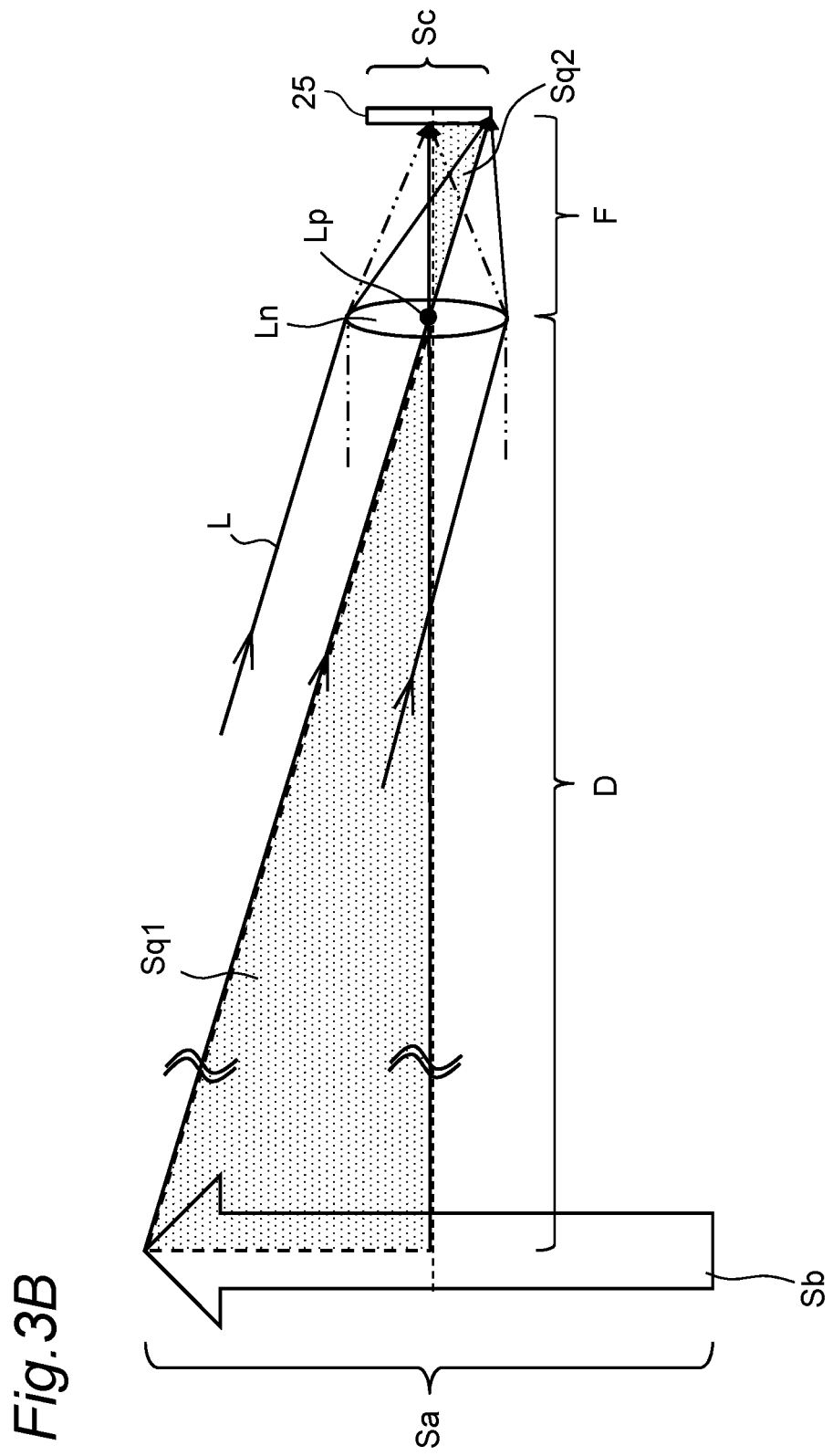
FIG. 3B illustrates a general subject distance.
Figure 3C:
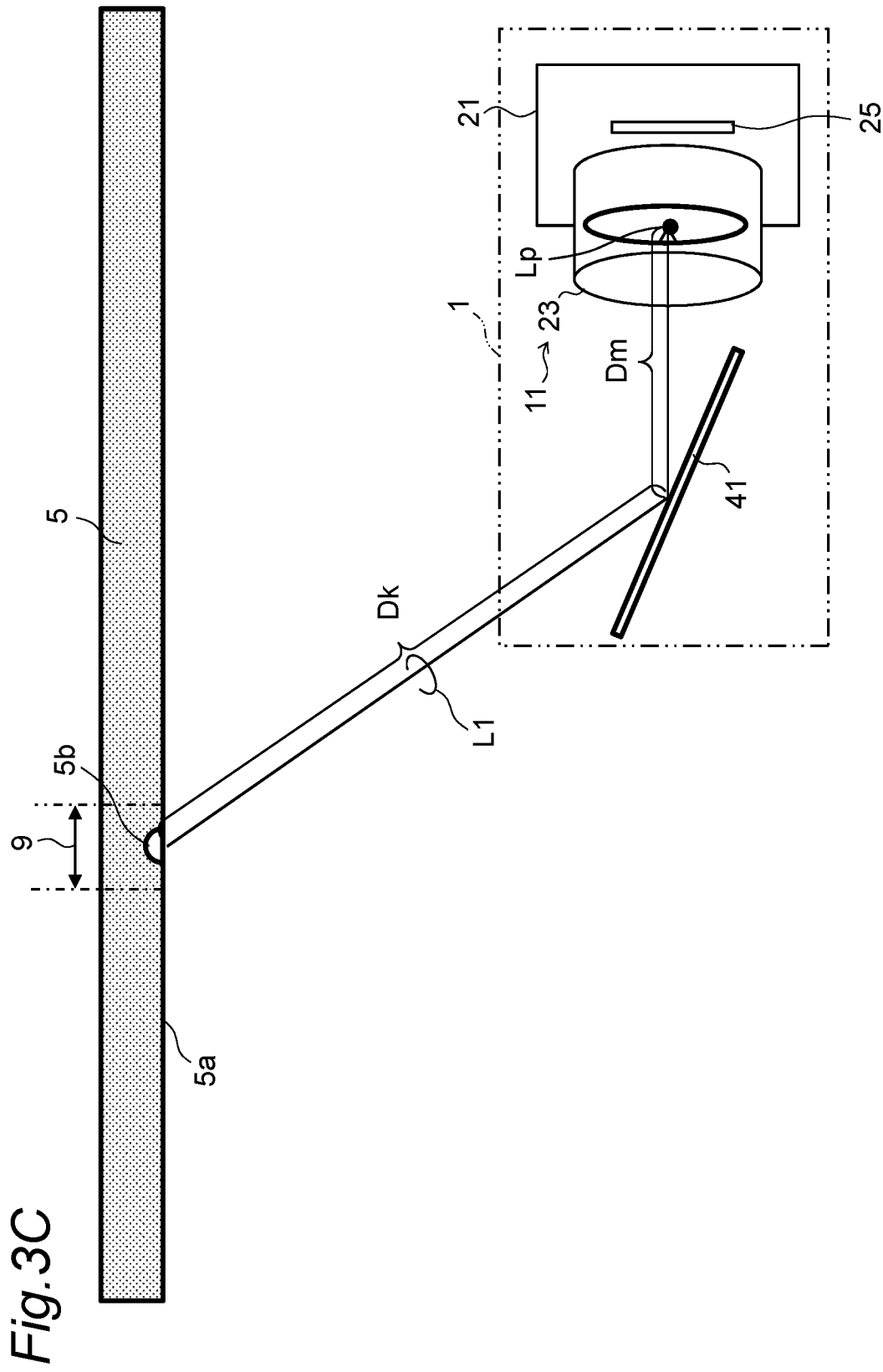
FIG. 3C illustrates a subject distance in the embodiment.

Here, referring to FIGS. 3B and 3C, the subject distance from the imaging element 25 to the object to be imaged will be described in detail. FIG. 3B is an explanatory view explaining a general subject distance D. FIG. 3C is an explanatory view showing a subject distance D in the embodiment.

As shown in FIG. 3B, the subject distance D [m] is a distance to an object Sb to be imaged as a subject from a principal point Lp of a lens Ln arranged between the object Sb to be imaged and the imaging element 25. The focal length F is a distance from the principal point Lp of the lens Ln to the imaging element 25. The principal point Lp is not necessarily located at the center of the lens Ln and may be located outside of the lens Ln, depending on the lens shape of the lens Ln or in the case where the lens Ln is composed of a plurality of lenses.

Based on the subject distance D, the focal length F, and a longitudinal size Sc [mm] of the imaging element 25, an imaged range Sa as a subject size that fits within an angle of view is determined by the homothetic ratio between two triangular areas Sq1 and Sq2. When parallel light L from the imaged range Sa is incident on the lens Ln, it is condensed on the imaging element 25.

Reference is made to FIG. 3C. The subject distance D in the embodiment includes a distance Dk from the area 9 to be imaged to the mirror 41 and a distance Dm frame the mirror 41 to the principal point Lp of the lens 23. Hence, a relationship D=Dk+Dm is established.

Since the subject distance D varies as the vehicle 3 moves, the subject distance D is detected and updated even during vehicle movement, whereby the subject distance variation is dealt with to suppress lowering in the blur correction accuracy during image capturing. To detect this subject distance, for example, use is made of an image movement distance for each imaging interval and a movement distance of the vehicle 3 for each imaging interval. The imaging interval may be a time interval or may be a distance interval. In this embodiment, an image is captured with exposure in synchronism with pulse update of a vehicle velocity signal output from the velocity detector 3a, so that imaging is carried out at an equal distance interval. Instead of synchronizing with the pulse update of a vehicle velocity signal, an image may be captured at a certain frame rate, based on the movement velocity output from the velocity detector 3a.

Reference is made to FIG. 2. The correction processor 33 controls the blur correction mechanism 31 to correct blur. The correction processor 33 includes a blur correction amount setting part 51, a vehicle movement amount calculator 53, a pixel movement amount calculator 55, a subject magnification calculator 57, a subject distance calculator 59, and a pixel resolution calculator 61.

The correction processor 33 is a circuit that can be implemented by a semiconductor element or the like. The correction processor 33 can be configured by, for example, a microcomputer, a CPU, an MPU, a GPU, a DSP, an FPGA, or an ASIC. Functions of the correction processor 33 may be configured by only hardware, or may be implemented by combining hardware and software together. The correction processor 33 reads out data or programs stored in the storage 15 to perform various arithmetic processes, to thereby implement predefined functions.

The blur correction amount setting part 51 calculates a mirror swing angle $\alpha$ of the mirror 41 during image capturing, along the following flow, on the basis of a movement velocity V1 of the vehicle 3, a set exposure time Tp, the subject magnification M, and the focal length F of the lens 23.

A vehicle movement amount La of movement of the vehicle 3 during the exposure time Tp from the start of imaging to the end of imaging is calculated from the movement velocity V1 and the exposure time Tp, using Formula (1) which follows:

$$La \text{ [mm]} = V1 \text{ [km/h]} \cdot 10^6 \cdot Tp \text{ [ms]}/(60^2 \cdot 10^3) \qquad (1)$$

A movement amount P of pixel on the imaging element 25 during the exposure time Tp from the start of imaging to the end of imaging is calculated from the vehicle movement amount La of the vehicle 3 and the subject magnification M, using Formula (2) which follows:

$$P \text{ [mm]} = La \text{ [mm]} \cdot M \qquad (2)$$

Since this movement amount P of pixel causes blurring, to prevent blur from occurring, the optical path of light incident on the lens 23 is changed by a movement blur correction angle $\theta$, correspondingly to the movement amount P of pixel. The movement blur correction angle $\theta$ is calculated from the movement amount P of pixel and the focal length F, using Formula (3) which follows:

$$\theta \text{ [degree]} = \arctan(P/F) \qquad (3)$$

The mirror swing angle $\alpha$ is half the magnitude of the movement blur correction angle $\theta$ and therefore is calculated using Formula (4) which follows:

$$\alpha = \theta/k \qquad (4)$$

where k is a conversion coefficient between the mirror swing angle $\alpha$ as a mechanism swing angle of the drive mechanism and the movement blur correction angle $\theta$ as an optical correction angle by which light incident on the lens 23 is corrected. In the case of the configuration where light from the object to be imaged travels in the order of the mirror 41, the lens 23, and the imaging element 25 as in the embodiment of FIG. 1, the conversion coefficient k=2. In the case of the configuration employing the whole camera drive or the pan and tilt mechanism having the imaging device 11 and the blur correction mechanism 31 integrated, the conversion coefficient k=1.

In this manner, the blur correction amount setting part 51 calculates the mirror swing angle $\alpha$ of the mirror 41.

Thus, by pivoting the mirror 41 in the direction opposite to the movement direction while being exposed to light, the imaging device 11 can receive light from the same area 9 to be imaged during exposure, making it possible to suppress occurrence of movement blur on the captured image. Here, the focal length F of Formulae (2) and (3) is a value determined by the lens 23, and the subject magnification M is a value determined by the focal length F and the subject distance D.

Parameters for use in blur correction are: a pixel-unit pixel movement amount qa [px] and a length-unit pixel movement amount qb [mm] that represent a pixel movement amount by which a feature point moves during an imaging interval; the subject distance D [m]; a vehicle movement amount Lb [mm] by which the vehicle 3 moves during the imaging interval; a pixel pitch s [μm/px] of a captured image; and a vertical pixel count Vpx [px] of the captured image. Predetermined values are the focal length F [mm] of the lens 23, the pixel pitch s [μm/px] of the captured image, and the vertical pixel count Vpx [px] of the captured image. In this embodiment, in the case of meaning both the pixel-unit pixel movement amount qa and the length-unit pixel movement amount qb, they are described simply as a pixel movement amount q.

Figure 5A:
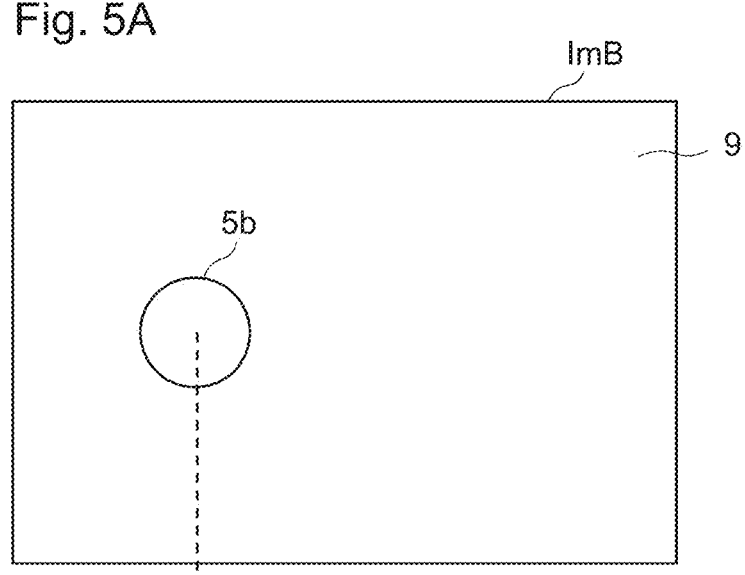
FIGS. 5A and 5B illustrate movement of a feature point in an image captured at each of contiguous imaging frames.
Figure 5B:
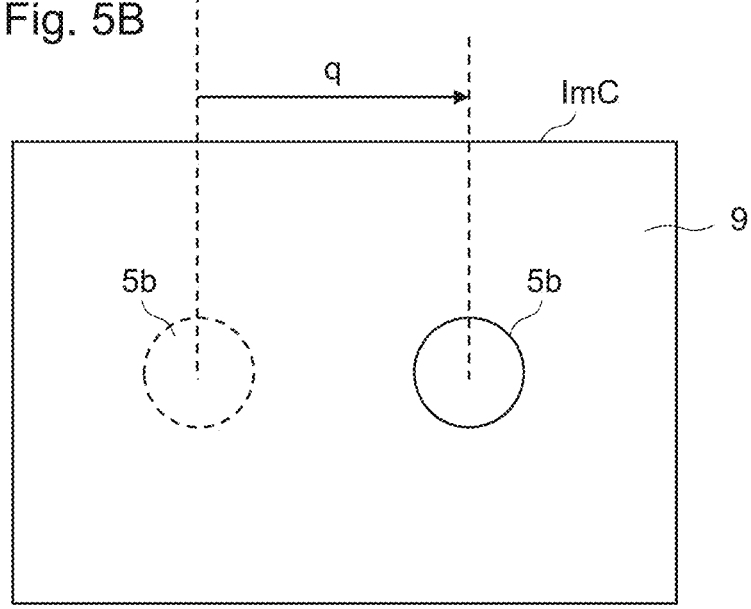

Reference is made to FIGS. 5A and 5B. While FIG. 4 shows a feature point that moves during image capturing, FIGS. 5A and 5B shows an image ImB of a first captured feature point of an imaging frame at a certain timing, and an image ImC of a first captured feature point of a next imaging frame.

The image processor 14 calculates, for example, a pixel movement amount q between imaging frames of a feature point such as the hole 5b, by image matching processing of the two captured images ImB and ImC captured at different frames. The pixel movement amount q may be that of one point within the captured images ImB and ImC or may be a mean value of pixel movement amounts q1, q2, . . . , and qn of a plurality of points.

The image processor 14 is a circuit that is implementable by a semiconductor element or the like. The image processor 14 can be configured by, for example, a microcomputer, a CPU, an MPU, a GPU, a DSP, an FPGA, or an ASIC. Functions of the image processor 14 may be configured by only hardware, or may be implemented by combining hardware and software together. The image processor 14 reads out data or programs stored in the storage 15 to perform various arithmetic processes, to thereby implement pre-defined functions.

In this embodiment, an image is captured with exposure in synchronism with pulse update of a vehicle velocity signal output from the velocity detector 3a. This enables direct calculation of the movement amount of the vehicle 3 from the vehicle velocity signal, instead of detecting the movement velocity of the vehicle 3. The vehicle movement amount calculator 53 calculates a vehicle movement amount Lb of the vehicle 3 at an imaging interval between two captured images, based on a vehicle velocity signal received from the velocity detector 3a. The vehicle movement amount Lb is expressed as Lb=a. a is a certain value that represents a distance by which the vehicle 3 moves between pulse updates.

The pixel movement amount calculator 55 calculates the length-unit pixel movement amount qb by Formula (5) which follows:

$$qb = qa \cdot s / 10^3 \quad (5)$$

The subject magnification calculator 57 calculates the subject magnification M by Formula (6) which follows:

$$M = qb / Lb = qa \cdot s / 10^3 / a \quad (6)$$

The subject distance calculator 59 calculates the subject distance D by Formula (7) which follows:

$$D = F / M / 10^3 \quad (7)$$

Here, a vertical imaged range R satisfies Formula (8) which follows:

$$R = Vpx \cdot s / 10^3 \cdot D / F \quad (8)$$

Accordingly, the pixel resolution calculator 61 calculates a pixel resolution X by Formula (9) which follows:

$$X = R / Vpx \cdot 10^3 \quad (9)$$

The pixel resolution calculator 61 can correlate the pixel unit of a captured image with the length unit thereof from the calculated pixel resolution of the captured image, and therefore may measure the length of a crack during the image capturing or may store the captured image converted to the length unit into the storage 15.

The storage 15 is a storage medium that stores programs and data required for implementing the functions of the correction processor 33. The storage 15 can be implemented by, for example, a hard disk drive (HDD), a solid state drive (SSD), a RAM, a DRAM, a ferroelectric memory, a flash memory, a magnetic disk, or a combination thereof.

An operation part 7 is an input device for the user to instruct the correction processor 33. The operation part 7 may be an input device dedicated to the imaging system 1 or may be a handheld terminal such as a smartphone. In the case of using the handheld terminal as the operation part 7, the operation part 7 and the correction processor 33 interchange data with each other via wireless communication. Using the operation part 7, the user may instruct the correction processor 33 of whether the area to be imaged is an indoor dark area such as the interior of a tunnel or an outdoor bright area such as a mountain slope. In the case of capturing images at a certain time interval, the operation part 7 may be used to instruct the correction processor 33 of a framerate Tf. The operation part 7 has a display that displays an alarm or the like from the imaging system 1 for notification to the user.

2. Action of Imaging System

Figure 6:
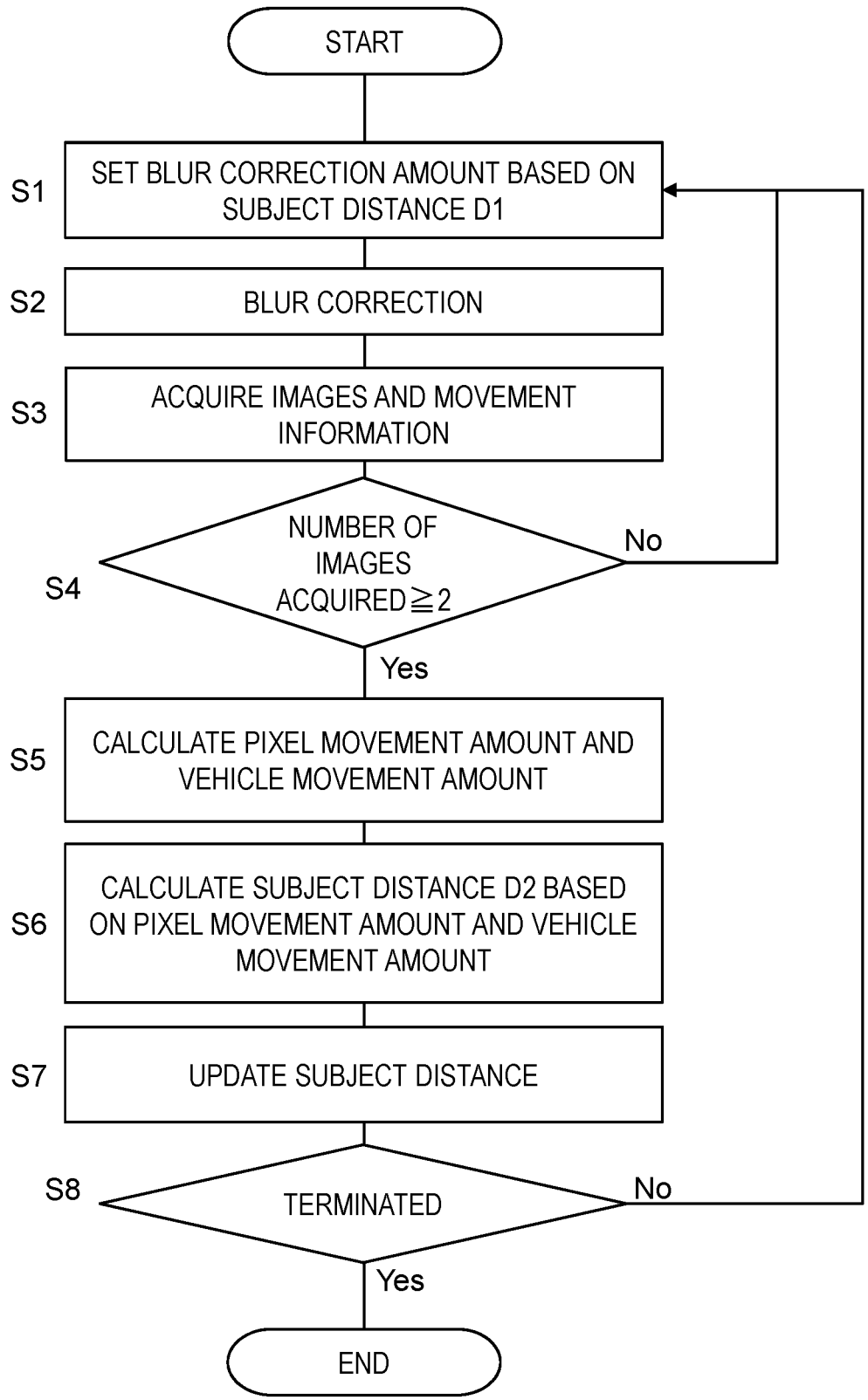
FIG. 6 is a flowchart showing blur imaging processing in the embodiment.
Figure 7:
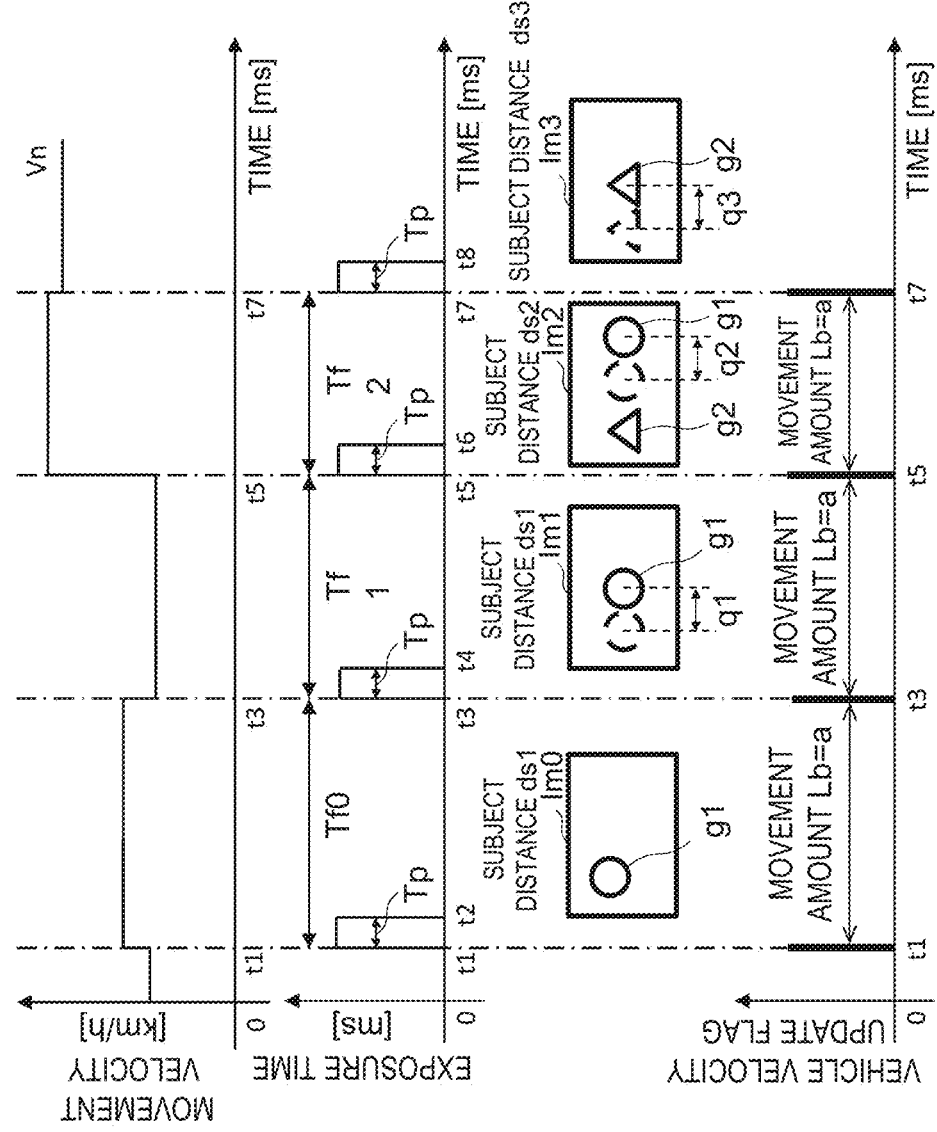
FIGS. 7A to 7D are graphs showing a relationship among change in the movement velocity, timing of the exposure time, and a movement blur correction angle.

Referring then to FIGS. 6 and 7A-7D, action of the imaging system 1 will be described. FIG. 6 is a flowchart showing imaging processing performed by the imaging system 1. FIGS. 7A to 7D are graphs showing relationships among change in the movement velocity, timing of the exposure time, captured images, and a vehicle velocity update flag. FIG. 7A is a graph showing the movement velocity of the vehicle 3 that changes over time. FIG. 7B is a graph showing timing of the exposure time for each frame. FIG. 7C is an explanatory view showing images captured on a frame-by-frame basis. FIG. 7D is a graph showing timing when the vehicle velocity update flag rises. The imaging processing shown in FIG. 6 is started, for example, when an instruction to start imaging is issued from the operation part 7 during movement of the vehicle 3.

When the instruction of start of imaging is issued from the operation part 7, the imaging processing of an image Im0 at a first frame is started. The blur correction amount setting part 51 of the correction processor 33 calculates and sets a movement blur correction angle θ that is the blur correction amount, based on a predefined distance da1 stored as a subject distance D1 in the storage 15 (step S1). Since a subject distance D2 has not yet been calculated from a captured image immediately after the start of imaging, the predefined distance dal is used, or for example, a value input from the operation part 7 may be used. Hereinafter, let D1 and D2 be a set or updated subject distance value and a calculated subject distance value, respectively.

The correction processor 33 calculates a mirror swing angle α based on the set movement blur correction angle θ, and calculates a mirror pivotal velocity based on the calculated mirror swing angle α and the set exposure time Tp. The correction processor 33 further pivots the mirror 41 at the calculated mirror pivotal velocity so that the mirror 41 starts to pivot from a predefined initial angle. The blur correction during image capturing of the imaging device 11 is thus carried out (step S2). At the same time, the correction processor 33 continues to send an Hi signal for exposure instruction to the camera controller 27 during the exposure time Tp.

In the imaging device 11, the camera controller 27 opens the shutter 24 for exposure during reception of the Hi signal, to acquire the image Im0 of the first frame, while the correction processor 33 acquires movement information of the vehicle 3 between imaging frames from the velocity detector 3a (step S3).

After lapse of the exposure time Tp, the correction processor 33 continues to send a Low signal for exposure stop instruction to the camera controller 27. The camera controller 27 closes the shutter 24 during reception of the Low signal, while the correction processor 33 causes the mirror drive 43 to reversely pivot the mirror 41 to return the mirror 41 to its initial angle. The mirror drive 43 may forward pivot the mirror 41 to return the mirror 41 to its initial angle.

The correction processor 33 determines whether the number of the captured images acquired is two or more (step S4), and if negative (step S4: No), the procedure goes back to step S1, starting the imaging processing of an image Im1 of the next frame, e.g., a second frame.

In the second frame imaging processing, the blur correction amount setting part 51 sets a movement blur correction angle θ that is the blur correction amount, based on the distance dal equal to the distance of the first frame as the subject distance D1. Afterward, imaging processing similar to that of the first frame is carried out so that the imaging device 11 captures a first image Im1 of the second frame shown in FIG. 7C. The captured image Im1 is stored in the storage 15.

Since the two images Im0 and Im1 have been stored in the storage 15, the correction processor 33 determines that the number of the captured images acquired is two or more (step S4: Yes), whereupon the pixel movement amount calculator 55 calculates a pixel movement amount qb between two or more captured images and the vehicle movement amount calculator 53 calculates a vehicle movement amount Lb by which the vehicle 3 moves between from the start of imaging of the current imaging frame to the start of imaging of the next imaging frame, from the acquired movement information (step S5). The calculated vehicle movement amount Lb is correlated with the captured image and stored in the storage 15. The subject distance calculator 59 calculates a subject distance D2, based on the pixel movement amount qb between the two or more captured images and the vehicle movement amount Lb (step S6).

The images Im1 and Im0 contain a common feature portion g1 imaged, and the image processor 14 detects a pixel movement amount q1 between the images Im0 and Im1 by the image matching processing. On the basis of this pixel movement amount q1, the subject distance calculator 59 calculates a distance ds2 as a new subject distance D2.

When calculating the new subject distance D2, the subject distance calculator 59 updates the subject distance D1 to the subject distance D2 (step S7). For example, the subject distance D1 calculated from the captured image of an n-th frame is updated as the subject distance D1 of an (n+1)th frame. In this case, the updated subject distance D1 (=ds2) is used when setting the blur correction amount upon capturing an image of the next frame.

If the correction processor 33 determines that imaging capturing has finished (step S8: Yes), it brings imaging by the imaging system 1 with the moving body 3 to an end. If the correction processor 33 determines that image capturing has not yet finished (step S8: No), it goes back to step S1 to capture an image at the next frame.

Returning to step S1, for example, an image Im2 of a third frame as the next frame is captured. In imaging processing of the third frame, the blur correction amount setting part 51 sets a movement blur correction angle θ that is the blur correction amount, based on a second distance ds2 different from the distance of the second frame as the subject distance D1. Subsequently, imaging processing similar to that of the second frame is carried out so that the imaging device 11 captures a second image Im2 of the third frame shown in FIG. 7C. The captured image Im2 is stored in the storage 15.

In the case of continuously imaging, the image processor 14 detects a pixel movement amount q2 of a common feature portion g1 appearing on the first image Im1 captured based on a first distance (e.g., ds1) and the second image Im2 captured based on the second distance (e.g., ds2). Based on the pixel movement amount q2, the subject distance calculator 59 calculates a distance ds3 as the new subject distance D2. In addition, by updating the subject distance as the subject distance D1 of a next captured image Im3 and capturing the image, it is possible to set the movement blur correction angle θ with high accuracy depending on the varying subject distance, leading to improvement in blur correction accuracy. In the case where the ratio between the pixel movement amount q and the vehicle movement amount Lb of the vehicle 3 changes, the subject distance D1 varies.

Two effects of the imaging system 1 of the embodiment updating the subject distance D in this manner will be described. The two effects obtainable are an effect of improving the calculation accuracy of the subject distance D and an effect of dealing with variation of the subject distance D. The effect of improving the calculation accuracy of the subject distance D is as follows. For example, sufficient accuracy may not necessarily be provided by processing two contiguous images only once to update the subject distance D once. It may therefore be necessary to update the subject distance D even in the situation where the variation of the subject distance D is small.

Figure 8:
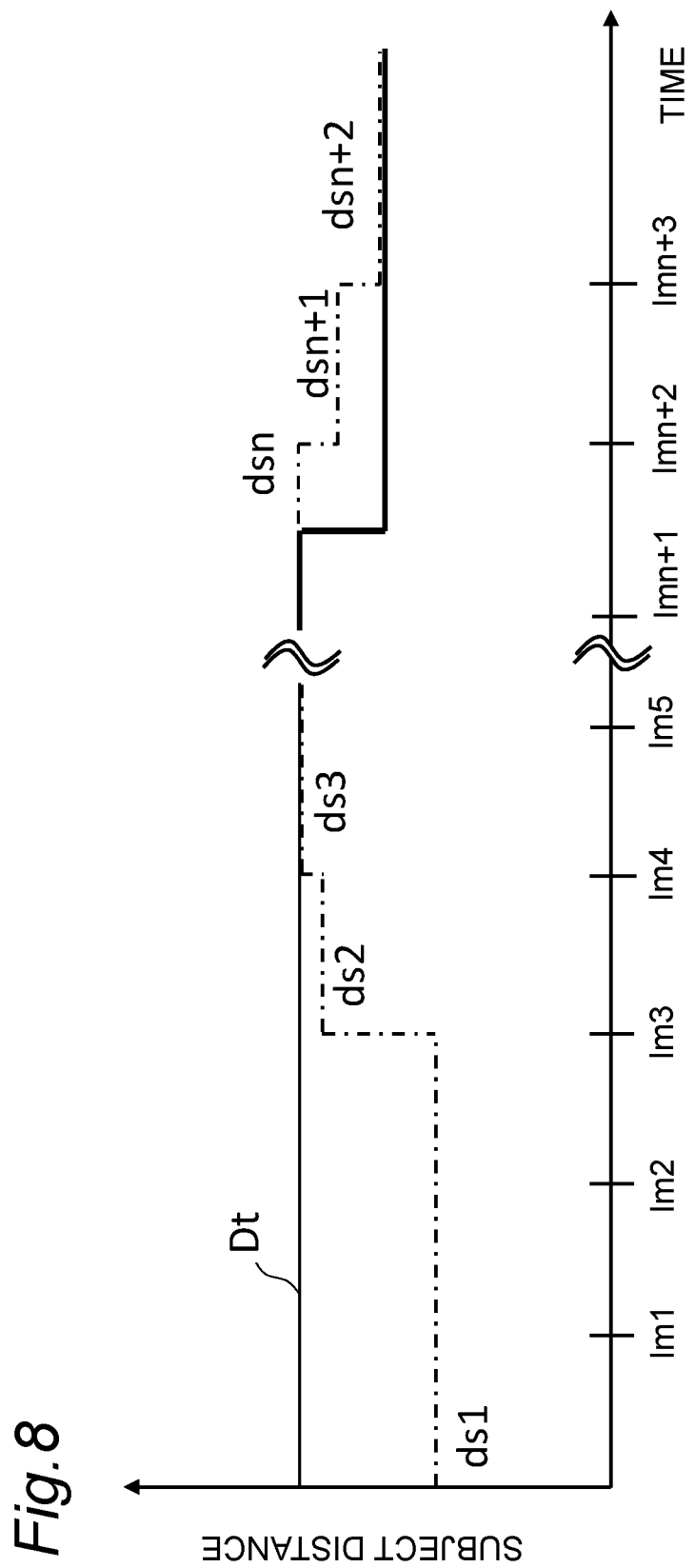
FIG. 8 is a graph showing an effect of the embodiment.

Since the blur correction accuracy of the captured image lowers if the subject distance D cannot be accurately set, the movement amount calculation accuracy by the image processing also lowers, resulting in lowering of the calculation accuracy of the subject distance D. In this manner, improvement in the blur correction accuracy and improvement in the calculation accuracy of the subject distance D are interrelated, making it impossible to improve one after securing the accuracy of the other. However, regarding the image processing, on the other hand, it is possible to detect the pixel movement amount even if the blur does not reach zero. Thus, for example, as shown in FIG. 8, images Im1 and Im2 are captured whose blur has been corrected using the first distance ds1 as a temporarily set subject distance, on the basis of which a second distance ds2 as the subject distance is calculated by the image processing. An image Im3 is captured whose blur has been corrected using the calculated second distance ds2, and a third distance ds3 as the subject distance is calculated on the basis of the images Im2 and Im3 by the image processing. By using the calculated third distance ds3, an image Im4 can be captured whose blur correction has been further improved. Hence, the calculated subject distance approximates to a true value Dt each time the subject distance D is updated, thereby enabling an image whose blur correction accuracy has been improved to be captured, leading to improved movement amount calculation accuracy by the image processing.

The effect of dealing with variation of the subject distance D is as follows. As has been already described, the calculated subject distance approximates to a true value Dt accordingly each time it is updated even though the true value Dt of the subject distance varies, whereby the blur can be corrected accommodating variation of the subject distance.

3. Effects, Etc

In this manner, the imaging system 1 includes: the imaging device 11 having the imaging element 25 that captures an object to be imaged spaced apart from the vehicle 3 and constituting at least a part of the surroundings of the vehicle 3; and the blur correction device 13 having the vehicle movement amount calculator 53 that calculates the movement amount of the vehicle 3, the blur correction device 13 setting a blur correction amount of blur in the movement direction when the imaging device 11 captures images during movement of the vehicle 3, based on the subject distance D1 from the imaging device 11 to the object to be imaged, the blur correction device 13 correcting blur during image capturing by use of the set blur correction amount. The imaging system 1 further includes the image processor 14 that calculates a pixel movement amount q of a feature portion g1 common to a first image Im1 captured by the imaging device 11 and a second image Im2 captured posterior to the first image Im1. The subject distance calculator 59 of the blur correction device 13 calculates a third distance ds3 as a subject distance D2 of a third image Im3 captured posterior to the second image Im2, based on the pixel movement amount q and a vehicle movement amount Lb of the vehicle 3 at an imaging interval between the first image Im1 at the first distance ds1 as the subject distance D1 and the second image Im2 at the second distance ds2 as the subject distance D1.

Even in the case where the actual subject distance Dt as a true value varies due to movement of the vehicle 3, the blur correction accuracy can be improved by detecting the subject distance D1 also during the movement of the vehicle 3 and calculating the second distance D2.

The blur correction device 13 updates the subject distance D1 to the third distance ds3 and sets the blur correction amount when capturing the third image Im3, based on the updated subject distance D1. Due to updating of the blur correction amount based on the updated subject distance D1, the third image Im3 with improved blur correction can be captured.

The first distance ds1 and the second distance ds2 as their respective subject distances when capturing the first image Im1 and the second image IM2 may be values detected based on the pixel movement amounts of two images each precedently captured and on the movement amount of the moving body at the imaging interval between the two images.

Immediately after start of imaging, the subject distance D1 of the initial image Im0 and the subject distance D1 of the second image Im2 may be the same predefined value ds1.

The first distance ds1 and the second distance ds2 are values detected based on the pixel movement amounts q1 and q2 of the images Im1 and Im2 each captured earlier than the third image Im3 and on the vehicle movement amount Lb of the vehicle 3.

The blur correction device 13 may perform updating using, as the subject distance D1, a mean value of the subject distance calculated 2 frames earlier and the subject distance calculated 1 frame earlier. For example, the blur correction device 13 may calculate a mean value of the distance ds2 calculated 2 frame earlier and the distance ds1 calculated 1 frame earlier, as the subject distance D2 when capturing a fourth image Im4, and perform updating using, as the subject distance D1, the subject distance D2 calculated as the mean value.

Other Embodiments

As above, the embodiment has been described as an exemplification of technique disclosed in this application. However, the technique in this disclosure is not limited thereto, and is applicable to embodiments undergoing appropriate changes, permutations, additions, omissions, or the like. Other embodiments will thus be exemplified hereinbelow.

Although in the above embodiment, the pixel movement amount of a feature point by image matching of two captured images, of three contiguous captured images has been used for calculation of the subject distance of the third captured image, this is not limitative. In the case where the image matching processing of the two captured images is later than the imaging period, the subject distance may be calculated several frames later.

In the above embodiment, in the case where the detected second distance is out of a predefined range, the image processor 14 may issue a warning signal, for example, to the operation part 7, a loudspeaker, or an image display device. This enables the driver of the vehicle 3 to recognize that the second distance is out of the predefined range. The warning signal is issued when the subject distance is longer or shorter than an expected one.

In the case where the subject distance is shorter than the expected one, the subject magnification M becomes greater and the pixel movement amount also increases. This enlarges the mirror swing angle required for blur correction, which may exceed the maximum swing angle. In the case where the subject distance is longer than the expected one, the subject magnification M becomes smaller and the pixel resolution [mm/px], which is the actual size of each pixel, becomes coarser, with the result that required inspection accuracy may not be acquirable. Since, in this manner, when the second distance is out of the predefined range, it becomes impossible to suppress the degradation of the blur correction or to secure the required inspection accuracy, warning is issued to the user so that the user can perform reinspection. For example, in the case where the cause is that the subject distance D has changed due to meandering of the vehicle 3, reinspection is performed by re-driving. In the case where the cause is variation in the object-to-be-imaged side with no problem in driving the vehicle, replacement of lens 23 can be prompted.

Figure 9:
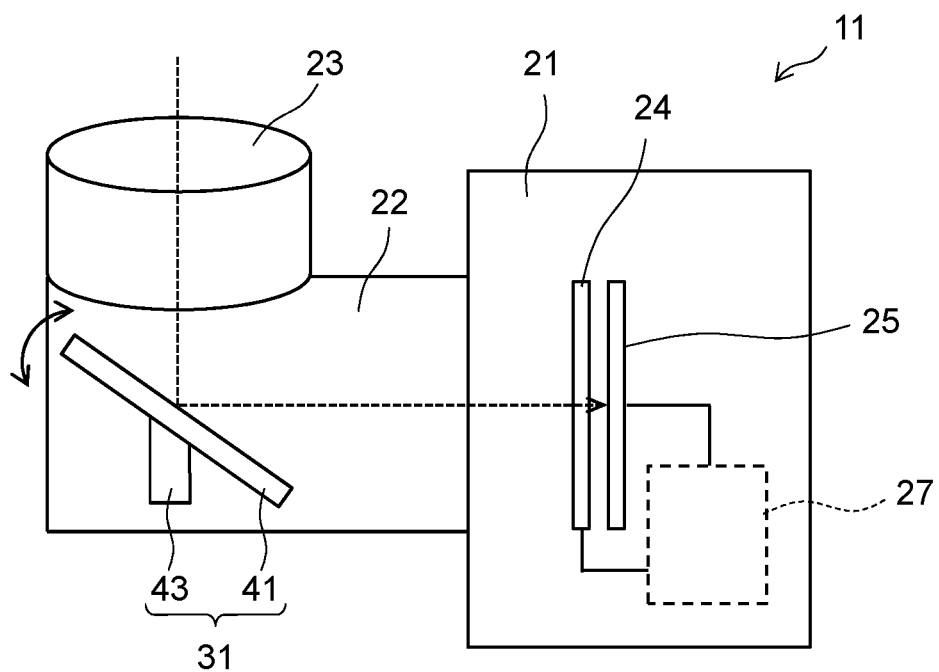
FIG. 9 shows a variant of an imaging device and a blur correction mechanism.

Although in the above embodiment, the imaging device 11 and the blur correction mechanism 31 are disposed separately from each other, this is not limitative. As shown in FIG. 9, the imaging device 11 may include a housing 22 that connects the lens 23 and the camera body 21, with the blur correction mechanism 31 being housed in the housing 22.

Figure 10:
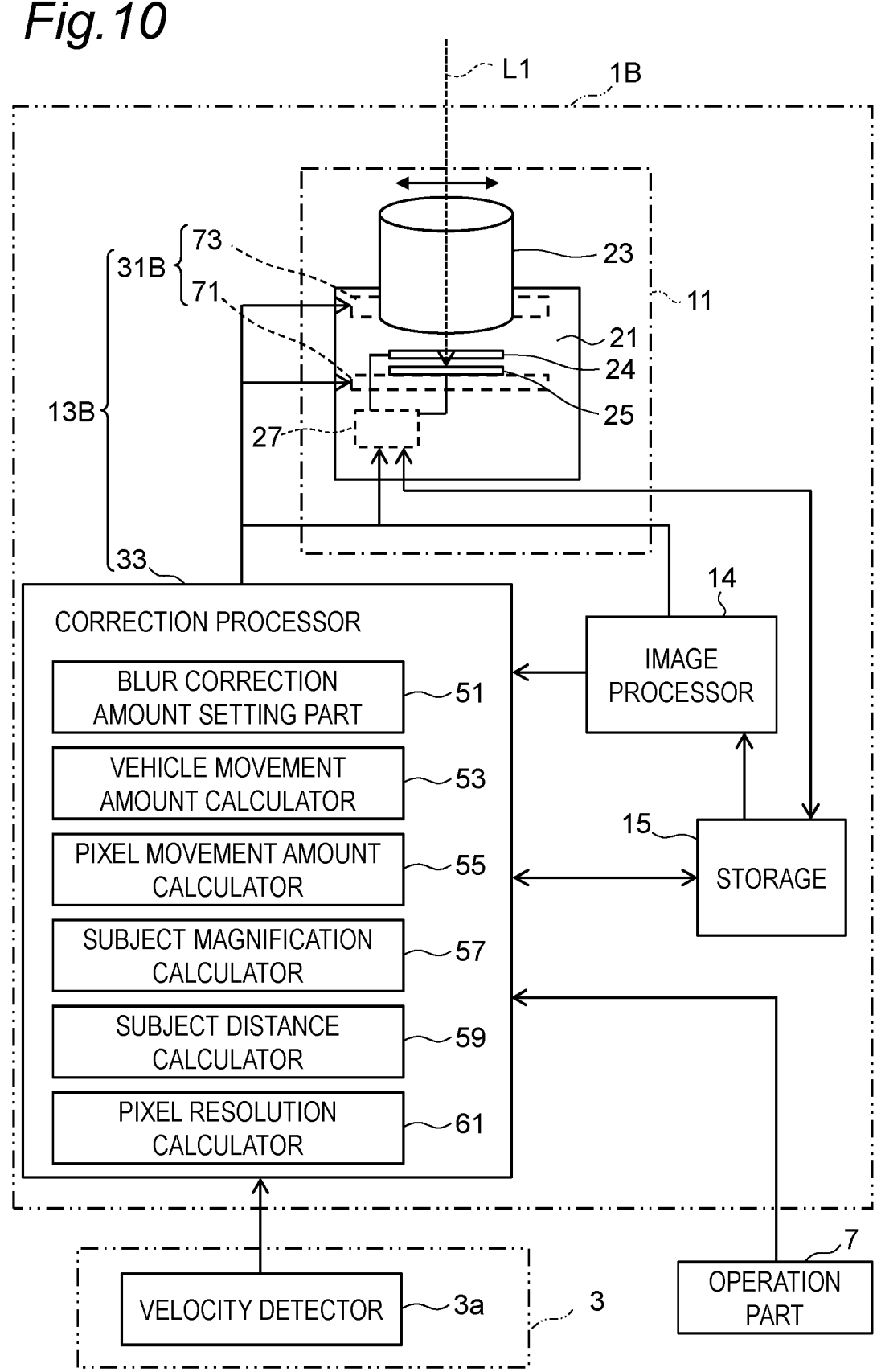
FIG. 10 shows a configuration of an imaging system of a variant.

Although in the above embodiment, the movement blur correction angle θ corresponding to the movement amount P of pixel is calculated for blur correction, with the mirror 41 being pivoted by the mirror swing angle α corresponding to the movement blur correction angle θ, to capture an image, this is not limitative. Instead of using the movement blur correction angle θ for blur correction, the imaging element 25 and the lens 23 may be driven in translation. In this case, as in an imaging system 1B shown in FIG. 10, the lens 23 of the imaging device 11 directly faces the area 9 to be imaged (see FIG. 1), while a blur correction mechanism 31B includes: an imaging element drive mechanism 71 that drives the imaging element 25 in translation with respect to the area 9 to be imaged; and an optical system lens drive mechanism 73 that drives the lens 23 in translation. The imaging element drive mechanism 71 and the optical system lens drive mechanism 73 are, for example, translation drive mechanisms each composed of a pinion gear, a rack, and a motor. The translation drive amount by which the imaging element drive mechanism 71 drives the imaging element 25 is equal to the movement amount P of pixel, while the translation drive amount by which the optical system lens drive mechanism 73 drives the lens 23 is a value obtained by multiplying the movement amount P of pixel by a constant m. The constant m is a number greater than or equal to 0. The translation amount relative to the lens drive amount changes depending on the optical system. Instead of individually driving the lens 23 and the imaging element 25 in translation, the entire imaging device 11 may be driven in translation.

Although the above embodiment utilizes information of the movement velocity V1 provided from the velocity detector 3a of the vehicle 3, this is not limitative. The imaging system 1 may include a velocity detector that detects the movement velocity of the imaging system 1. The velocity detector may be one utilizing a global positioning system (GPS) or an acceleration sensor.

Although in the above embodiment, the imaging system 1 images a wall surface above and lateral to the vehicle 3, this is not limitative. The imaging system 1 may image a road surface below the vehicle 3. From the captured images, a pothole, a crack, a rut, etc., generated on the road surface can be detected by the image processing.

In the above embodiment, the case has been described where the moving body is the vehicle 3 such as an automobile. However, the moving body is not limited to the vehicle 3, and can be a vehicle such as a train or a motorcycle that runs on land, a ship sailing on the sea, or a flying object such as an airplane or a drone that flies in the sky. In the case where the moving body is the ship, the imaging system 1 captures images of a bridge pier, a bottom surface of a bridge girder, as well as a structure built along the shore. In the case where the moving body is the train, overhead wires are imaged so that deflection of the overhead wires can be detected. Since the vehicle movement amount calculator 53 calculates the movement amount of the vehicle 3 as a moving body, in the case where the moving body is an object other than the vehicle, the vehicle movement amount calculator 53 calculates the movement amount of the moving object.

Although in the above embodiment, images by ambient light reflected on the area 9 to be imaged are captured, this is not limitative. Images by reflected light of light irradiated toward the area 9 to be imaged from the moving body may be captured.

Summary of Embodiments (1) An imaging system of the present disclosure is an imaging system disposed on a moving body, including: an imaging device having an imaging element that images an object to be imaged, which is at least a part of surroundings of the moving body, apart from the moving body; and a blur correction device having a moving body movement amount calculator that calculates a movement amount of the moving body, the blur correction device setting, based on a subject distance from the imaging device to the object to be imaged, a blur correction amount of blur in a movement direction caused when the imaging device captures images during movement of the moving body, the blur correction device correcting blur during image capturing by use of the set blur correction amount. The imaging system includes an image processor calculating a pixel movement amount of a feature portion common to a first image captured by the imaging device and a second image captured posterior to the first image. Based on the pixel movement amount and the movement amount of the moving body at an imaging interval between the first image with a first distance as the subject distance and the second image with a second distance as the subject distance, the blur correction device calculates a third distance as the subject distance of a third image captured posterior to the second image.

This enables detection of the subject distance even during movement of the moving body, making it possible to carry out the blur correction depending on variation of the subject distance, leading to improved blur correction accuracy.

(2) In the imaging system of (1), the blur correction device updates the subject distance to the third distance and sets a blur correction amount when capturing the third image, based on the subject distance updated.

(3) In the imaging system of (1) or (2), the first distance and the second distance as respective subject distances when capturing the first image and the second image are values detected based on the pixel movement amount between two images each precedently captured and on the movement amount of the moving body at an imaging interval between the two images.

(4) In the imaging system of (1) or (2), immediately after start of imaging, the first distance and the second distance are same predefined values.

(5) In the imaging system of (2), the blur correction device updates the subject distance when capturing the third image, to a mean value of the first distance calculated when capturing the first image and the second distance calculated when capturing the second image.

(6) In the imaging system of any one of (1) to (5), the subject distance changes when ratio between the pixel movement amount and the movement amount of the moving body varies.

(7) In the imaging system of any one of (1) to (6), the image processor calculates a pixel resolution of the second image, based on the second distance, and converts predefined pixel size unit of the second image from pixel unit to length unit, based on the calculated pixel resolution.

(8) In the imaging system of (2) or (5), the image processor calculates a second pixel movement amount of a feature portion common to the second image and the third image. The blur correction device calculates a fourth distance as the subject distance, based on the second pixel movement amount and on the movement amount of the moving body at an imaging interval between the second image and the third image. The blur correction device updates the subject distance to the fourth distance and sets the blur correction amount when capturing a fourth image captured posterior to the third image, based on the updated subject distance. By repeatedly updating the subject distance in this manner, accuracy of the calculated subject distance can be improved, achieving further improvement in the blur correction accuracy.

(9) In the imaging system of any one of (1) to (8), the image processor issues a warning signal when the second distance detected is out of a predefined range.

(10) The imaging system of any one of (1) to (9) includes a velocity detector that detects a movement velocity of the imaging system.

(11) In the imaging system of any one of (1) to (10), the blur correction device includes: a mirror that totally reflects ambient light reflected on the object to be imaged, toward the imaging device; and a mirror drive that pivotally drives the mirror, wherein the blur correction amount corresponds to a pivotal angle of the mirror.

(12) In the imaging system of any one of (1) to (10), the imaging device includes an optical system lens integrated with the imaging element, and the blur correction device includes a drive that pivotally drives the optical system lens and the imaging element integrated together, wherein the blur correction amount corresponds to a pivotal angle of the drive.

(13) In the imaging system of any one of (1) to (10), the imaging device includes an optical system lens focused on the imaging element, and the blur correction device includes a translation drive mechanism that drives the optical system lens and the imaging element in translation, toward direction within an imaging plane of the imaging element, wherein the blur correction amount corresponds to a translation amount of the optical system lens.

(14) A moving body of the present disclosure includes the imaging system of any one of (1) to (13). This allows the imaging system to capture images around the moving body with reduced blur while the moving body is moving.

The imaging system described in the present disclosure is implemented in cooperation with hardware resources, for example, a processor, a memory, and a program.

The present disclosure is applicable to an imaging system disposed on a moving body that moves.

EXPLANATIONS OF LETTERS OR NUMERALS 1 imaging system
3 vehicle
3a velocity detector
5 tunnel
5a wall surface
5b hole
5c crack
7 operation part
9 area to be imaged
11 imaging device
13 blur correction device
14 image processor
15 storage
21 camera body
23 lens
24 shutter
25 imaging element
27 camera controller
31 blur correction mechanism
33 correction processor
41 mirror
43 mirror drive
51 blur correction amount setting part
53 vehicle movement amount calculator
55 pixel movement amount calculator
57 subject magnification calculator
59 subject distance calculator
61 pixel resolution calculator
71 imaging element drive mechanism
73 optical system lens drive mechanism
α mirror swing angle
F focal length
M subject magnification
V1 movement velocity

What is claimed is:

1. An imaging system disposed on a moving body, comprising:
an imaging device having an imaging element that images an object to be imaged, which is at least a part of surroundings of the moving body, apart from the moving body;
a blur correction device having a moving body movement amount calculator that calculates a movement amount of the moving body, the blur correction device setting, based on a subject distance from the imaging device to the object to be imaged, a blur correction amount of blur in a movement direction caused when the imaging device captures images during movement of the moving body, the blur correction device correcting blur during image capturing by use of the set blur correction amount; and
an image processor calculating a pixel movement amount of a feature portion common to a first image captured by the imaging device and a second image captured posterior to the first image,
based on the pixel movement amount and the movement amount of the moving body at an imaging interval between the first image with a first distance as the subject distance and the second image with a second distance as the subject distance, the blur correction device calculating a third distance as the subject distance of a third image captured posterior to the second image.

2. The imaging system according to claim 1, wherein the blur correction device updates the subject distance to the third distance and sets a blur correction amount when capturing the third image, based on the subject distance updated.

3. The imaging system according to claim 1, wherein the first distance and the second distance as respective subject distances when capturing the first image and the second image are values detected based on the pixel movement amount between two images each precedently captured and on the movement amount of the moving body at an imaging interval between the two images.

4. The imaging system according to claim 1, wherein immediately after start of imaging, the first distance and the second distance are same predefined values.

5. The imaging system according to claim 2, wherein
the blur correction device updates the subject distance when capturing the third image, to a mean value of the first distance calculated when capturing the first image and the second distance calculated when capturing the second image.

6. The imaging system according to claim 1, wherein
the subject distance changes when ratio between the pixel movement amount and the movement amount of the moving body varies.

7. The imaging system according to claim 1, wherein
the image processor calculates a pixel resolution of the second image, based on the second distance, and
converts predefined pixel size unit of the second image from pixel unit to length unit, based on the calculated pixel resolution.

8. The imaging system according to claim 2, wherein
the image processor calculates a second pixel movement amount of a feature portion common to the second image and the third image, wherein
the blur correction device calculates a fourth distance as the subject distance, based on the second pixel movement amount and on the movement amount of the moving body at an imaging interval between the second image and the third image, and wherein
the blur correction device updates the subject distance to the fourth distance and sets the blur correction amount when capturing a fourth image captured posterior to the third image, based on the updated subject distance.

9. The imaging system according to claim 1, wherein
the image processor issues a warning signal when the second distance detected is out of a predefined range.

10. The imaging system according to claim 1, comprising:
a velocity detector that detects a movement velocity of the imaging system.

11. The imaging system according to claim 1, wherein
the blur correction device comprises:
a mirror that totally reflects ambient light reflected on the object to be imaged, toward the imaging device; and
a mirror drive that pivotally drives the mirror, and wherein
the blur correction amount corresponds to a pivotal angle of the mirror.

12. The imaging system according to claim 1, wherein
the imaging device comprises an optical system lens integrated with the imaging element, wherein
the blur correction device comprises a drive that pivotally drives the optical system lens and the imaging element integrated together, and wherein
the blur correction amount corresponds to a pivotal angle of the drive.

13. The imaging system according to claim 1, wherein
the imaging device comprises an optical system lens focused on the imaging element, wherein
the blur correction device comprises a translation drive mechanism that drives the optical system lens and the imaging element in translation, toward direction within an imaging plane of the imaging element, and wherein
the blur correction amount corresponds to a translation amount of the optical system lens.

14. A moving body comprising the imaging system according to claim 1.

15. The imaging system according to claim 2, wherein
the first distance and the second distance as respective subject distances when capturing the first image and the second image are values detected based on the pixel movement amount between two images each precedently captured and on the movement amount of the moving body at an imaging interval between the two images.

16. The imaging system according to claim 2, wherein
immediately after start of imaging, the first distance and the second distance are same predefined values.

17. The imaging system according to claim 2, wherein
the subject distance changes when ratio between the pixel movement amount and the movement amount of the moving body varies.

18. The imaging system according to claim 3, wherein
the subject distance changes when ratio between the pixel movement amount and the movement amount of the moving body varies.

19. The imaging system according to claim 4, wherein
the subject distance changes when ratio between the pixel movement amount and the movement amount of the moving body varies.

20. The imaging system according to claim 5, wherein
the image processor calculates a second pixel movement amount of a feature portion common to the second image and the third image, wherein
the blur correction device calculates a fourth distance as the subject distance, based on the second pixel movement amount and on the movement amount of the moving body at an imaging interval between the second image and the third image, and wherein
the blur correction device updates the subject distance to the fourth distance and sets the blur correction amount when capturing a fourth image captured posterior to the third image, based on the updated subject distance.

* * * * *